(12) United States Patent
Regensburger et al.

(10) Patent No.: US 12,260,570 B2
(45) Date of Patent: Mar. 25, 2025

(54) PROVIDING RESULT IMAGE DATA

(71) Applicant: Siemens Healthcare GmbH, Erlangen (DE)

(72) Inventors: Alois Regensburger, Poxdorf (DE); Amilcar Alzaga, Bayern (DE); Birgi Tamersoy, Erlangen (DE); Thomas Pheiffer, Philadelphia, PA (US); Ankur Kapoor, Plainsboro, NJ (US)

(73) Assignee: Siemens Healthineers AG, Forchheim (DE)

( * ) Notice: Subject to any disclaimer, the term of this patent is extended or adjusted under 35 U.S.C. 154(b) by 366 days.

(21) Appl. No.: 17/951,046

(22) Filed: Sep. 22, 2022

(65) Prior Publication Data
US 2023/0092430 A1    Mar. 23, 2023

(30) Foreign Application Priority Data
Sep. 23, 2021   (DE) ............... 10 2021 210 656.0

(51) Int. Cl.
*G06V 10/00* (2022.01)
*G06T 7/33* (2017.01)

(52) U.S. Cl.
CPC .... *G06T 7/344* (2017.01); *G06T 2207/30004* (2013.01)

(58) Field of Classification Search
CPC . G06T 7/344; G06T 7/33; G06T 2207/30004; G06T 2207/30056; G06T 2207/30084; G06T 2207/30096; G06T 2207/30101
See application file for complete search history.

(56) References Cited

U.S. PATENT DOCUMENTS 7,718,954 B2 *  5/2010  Wang ............... G01T 1/1648
                                                250/252.1
7,796,790 B2 *  9/2010  McNutt ............... G06T 7/11
                                                382/199

(Continued)

FOREIGN PATENT DOCUMENTS

WO    2014031531 A1    2/2014

OTHER PUBLICATIONS

Lester, Hava, and Simon R. Arridge. "A survey of hierarchical non-linear medical image registration." Pattern recognition 32.1 (1999): 129-149.

*Primary Examiner* — Amir Alavi
(74) *Attorney, Agent, or Firm* — Lempia Summerfield Katz LLC

(57) ABSTRACT

A model dataset is generated based on first image data. The model dataset and second image data map at least a common part of an examination region at a second detail level. The model dataset and the second image data are pre-aligned at a first detail level below the second detail level based on first features that are mapped at the first detail level in the model dataset and the second image data and/or an acquisition geometry of the second image data. The model dataset and the second image data are registered at the second detail level based on second features that are mapped at the second detail level in the model dataset and the second image data. The second class of features is mappable at the second detail level or above. The registered second image data and/or the registered model dataset is provided.

18 Claims, 8 Drawing Sheets

(56) References Cited

U.S. PATENT DOCUMENTS

| | | | |
|---|---|---|---|
| 7,907,698 B2* | 3/2011 | Shao | A61B 6/032 378/15 |
| 8,233,681 B2 | 7/2012 | Aylward et al. | |
| 8,406,495 B2* | 3/2013 | Gagnon | G06T 7/11 382/128 |
| 8,620,055 B2 | 12/2013 | Barratt et al. | |
| 8,768,432 B2* | 7/2014 | Ladebeck | A61B 6/032 324/309 |
| 9,158,382 B2* | 10/2015 | Asami | A61B 1/00048 |
| 9,659,389 B2* | 5/2017 | Ye | G06T 11/005 |
| 10,229,517 B2* | 3/2019 | Raupach | G06T 7/11 |
| 11,055,848 B2* | 7/2021 | Schmitt | G06T 7/0014 |
| 11,915,361 B2* | 2/2024 | Rohrer | G01R 33/5601 |
| 12,118,717 B2* | 10/2024 | Katzmann | G06F 18/2431 |
| 2009/0213034 A1* | 8/2009 | Wu | G16H 50/20 715/788 |

* cited by examiner

PROVIDING RESULT IMAGE DATA

This application claims the benefit of German Patent Application No. DE 10 2021 210 656.0, filed on Sep. 23, 2021, which is hereby incorporated by reference in its entirety.

BACKGROUND

The present embodiments relate to providing result image data.

A medical staff (e.g., an interventionalist and/or a surgeon) may be supported during an examination and/or treatment of a subject (e.g., intra-procedurally) via displaying a graphical representation of pre-procedural image data of the subject. The pre-procedural image data may include pre-processed information (e.g., a planning information). Often, intra-procedural image data of the subject is acquired for a supervision and/or guidance during the examination and/or treatment. In order to combine the pre- and the intra-procedural image data in a common graphical display, the pre- and intra-procedural image data may be registered. The registration may, for example, be based on anatomical and/or geometrical features of the subject that are commonly mapped in the pre- and intra-procedural image data. These features are often limited by the level of detail at which the features are mapped in the pre-procedural and/or the intra-procedural image data.

However, such registration between the pre- and intra-procedural image data may become challenging (e.g., when the pre- and intra-procedural image data contain a mapping of soft tissue organs such as a liver). Large deformations of such a soft tissue organ may lead to a large variation in the spatial positions of geometric and/or anatomical features of the soft tissue organ between the pre- and intra-procedural imaging. Here, the registration problem is often times underconstrained and may only be solved by making assumptions that may lead to unwanted deviations from reality.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and a device for a more robust and precise image registration are provided.

In a first aspect, the present embodiments include a method for providing result image data. In a first act, pre-acquired first image data of a subject including an examination region is received. Further, the first image data maps the examination region. In a further act, a model dataset is generated based on the first image data. In a further act, pre-acquired second image data of the subject is received. The model dataset and the second image data map at least a common part of the examination region at a second level of detail. In a further act, the model dataset and the second image data are pre-aligned at a first level of detail below the second level of detail based on first features of a first class of features of the examination region that are mapped at the first level of detail in the model dataset and the second image data. Alternatively or in addition, the model dataset and the second image data are pre-aligned at the first level of detail based on an acquisition geometry of the second image data with respect to the subject (e.g., the examination region). In a further act, the model dataset and the second image data are registered at the second level of detail based on second features of a second class of features of the examination region that are mapped at the second level of detail in the model dataset and the second image data. The second class of features is mappable at the second level of detail or above. In a further act, the registered second image data and/or the registered model dataset are provided as the result image data.

The aforementioned acts of the method may at least partially be executed successively and/or simultaneously. Further, the acts of the method may at least partially (e.g., completely) be computer-implemented.

The receiving of the pre-acquired first image data and/or the pre-acquired second image data may include collecting and/or reading out data from an electronically readable storage medium and/or receiving data from a memory unit (e.g., a database). Further, the pre-acquired first image data and second image data may be received from the same medical imaging device or different medical imaging devices. The at least one medical imaging device for acquiring the first image data and/or the second image data may include a magnetic resonance imaging system (Mill) and/or a positron emission tomography system (PET) and/or an ultrasound system and/or a medical X-ray system and/or a computed tomography system (CT) and/or an optical imaging system (e.g., an endoscope and/or a laparoscope).

In one embodiment, the first image data and the second image data were acquired before the beginning of the proposed method (e.g., the first image data and the second image data are pre-acquired).

The first image data may map the examination region of the subject two-dimensional (2D) or three-dimensional (3D) spatially resolved. Further, the second image data may map at least the common part of the examination region 2D or 3D spatially resolved. In addition, the first image data and/or the second image data image data may be time-resolved. The subject may be a human and/or animal patient and/or an examination phantom. Further, the examination region may include a spatial region of the subject (e.g., an anatomical region, such as an organ and/or a tissue). The common part of the examination region may include the examination region or a part (e.g., a spatial section) of the examination region. The first image data may include multiple image points (e.g., pixels or voxels) with image values assigned thereto mapping the examination region. Likewise, the second image data may each include multiple image points (e.g., pixels or voxels), with image values assigned mapping at least the common part of the examination region. If the first image data and/or the second image data are time-resolved, the image points may each include time-intensity curves. Thereby, the first image data and/or the second image data may each map a change in the examination region of the subject (e.g., a contrast agent flow and/or a motion, such as a physiological motion and/or a motion of a medical object). Further, the first image data may include first meta data, where the first meta data may include an information about the acquisition geometry and/or an acquisition parameter and/or an operating parameter of the medical imaging device for acquiring the first image data at the time of acquiring the first image data. Likewise, the second image data may include second meta data, where the second meta data may include an information about the acquisition geometry and/or an acquisition parameter and/or an operating parameter of the medical imaging device for acquiring the second image data at the time of acquiring the second image data.

In addition, the first image data may include a planning information (e.g., a surgical resection plan). The planning information may include a graphical workflow hint that is registered with the mapping of the examination region in the first image data (e.g., the features of the first class and/or second class of features).

In one embodiment, the first image data may map the examination region at a first acquisition time (e.g., pre-procedurally). Thereby, the first image data may map the examination region in a first deformation state. The first deformation state may, for example, be characterized by a spatial arrangement of the first features and/or second features mapped in the first image data relative to each other. Further, the second image data may map at least the common part of the examination region at a second acquisition time after the first acquisition time (e.g., intra- or post-procedurally). Thereby, the second image data may map the examination region in a second deformation state. The second deformation state may, for example, be characterized by a spatial arrangement of the first features and/or second features mapped in the second image data relative to each other.

The first level and/or the second level of detail may be characterized by mapping and/or acquisition parameters of the first image data, the second image data, and/or the at least one medical imaging device. For example, the first level and/or second level of detail may be characterized by a spatial resolution and/or time resolution. The first level and/or the second level of detail may be characterized by further image quality metrics of the first image data and/or the second image data, such as a dynamic range of image values, a signal-to-noise ratio (SNR), and/or a contrast-to-noise ratio (CNR). Further, the first level of detail and/or the second level of detail may be characterized by different types of anatomy (e.g., an organ and/or tissue type) that exhibit different image contrasts (e.g., for different imaging modalities and/or image acquisition parameters). The second level of detail may be determined and/or limited by the highest common spatial resolution and/or time resolution and/or image quality metric of the first and second image data. Further, the first level of detail may be determined by a level of accuracy for generating the model dataset (e.g., a reconstruction parameter and/or a model parameter). Alternatively or in addition, the first level of detail may be determined by a level of accuracy of the acquisition geometry of the second image data with respect to the subject.

The features of the first class of features may exhibit a size above a minimum size of the first class of features determined by the first level of detail. Likewise, the features of the second class of features may exhibit a size above a minimum size of the second class of features determined by the second level of detail and below the minimum size of the first class of features.

In one embodiment, the model dataset may include a 2D or 3D spatial representation of the examination region. Further, the model dataset may be time-resolved. In one embodiment, the model dataset may represent the examination region before the acquisition of the second image data (e.g., pre-procedurally). The model dataset may include the first image data. Alternatively, the model dataset may be generated based on the first image data (e.g., reconstructed and/or segmented from the first image data). The model dataset may exhibit all features laid out above for the first image data. Further, the model dataset may include a virtual representation of the examination region (e.g., an anatomical object and/or tissue within the examination region, such as a mesh model and/or a center line model).

The first class of features may include all features of the examination region (e.g., all geometrical and/or anatomical features) that are mappable and distinguishable (e.g., identifiable) at the first level of detail and above. The first class of features may, for example, include large-scale anatomical landmarks of the examination region (e.g., a tissue border and/or a shape of an organ surface and/or a tumor and/or a large vessel and/or a large vessel bifurcation). Since the features of the first class of features are mappable and identifiable at the first level of detail and above (e.g., also at the second level of detail), the second image data may include first features of the first class of features that are commonly mapped in the model dataset (e.g., in the first image data) and the second image data at the first level of detail. The first features of the first class of features may include geometrical and/or anatomical features of the examination region that are mapped at the first level of detail in the model dataset (e.g., the first image data) and the second image data. Further, at least part (e.g., all) of the first features that are mapped in the model dataset may be generated as part of the generating of the model dataset. For example, at least part (e.g., all) of the first features that are mapped in the model dataset are not mapped in the first image data. Here, the first image data may map features of the second class of features (e.g., the second features), but the first features may be generated (e.g., reconstructed) as part of the generating of the model dataset.

The pre-aligning of the model dataset and the second image data may include determining a first transformation rule for rigidly and/or deformably transforming (e.g., translating and/or rotating and/or deforming and/or scaling) the model dataset and/or the second image data. In one embodiment, a minimum level of accuracy of the pre-alignment between the model dataset and the second image data (e.g., a level of accuracy of the first transformation rule) may be equivalent to the first level of detail. The pre-aligning of the model dataset and the second image data may include minimizing a deviation (e.g., a misalignment) between the first features. Hence, the pre-alignment of the model dataset and the second image data may include an alignment of the first features at the first level of detail. Further, the pre-aligning of the model dataset and the second image data may include applying the first transformation rule to the model dataset and/or the second image data.

Alternatively or in addition, the pre-aligning of the model dataset and the second image data may be based on the acquisition geometry of the second image data with respect to the subject (e.g., in a subject coordinate frame). For example, the pre-aligning of the model dataset and the second image data may be based on the acquisition geometry of the second image data with respect to the examination region. The acquisition geometry of the second image data may be provided by the medical imaging device for acquiring the second image data. Alternatively, the acquisition geometry of the second image data may be detected by a tracking system (e.g., an optical and/or electromagnetic and/or ultrasound and/or mechanical sensor). The tracking system may be configured to detect the spatial position and/or orientation and/or pose of the at medical imaging device for acquiring the second image data at the time of acquiring the second image data with respect to the subject (e.g., the examination region).

The acquisition geometry of the second image data may include positioning information (e.g., a spatial position and/or orientation, such as an angulation, and/or pose) of the medical imaging device for acquiring the second image data at the time of acquiring the second image data (e.g., at the first level of detail) with respect to the subject (e.g., the examination region). For example, the pre-aligning of the model dataset and the second image data may be based on a relative positioning between the medical imaging device for acquiring the second image data at the times of acquiring the second image data and the subject (e.g., the examination region).

The model dataset and the second image data map at least the common part of the examination region at the second level of detail or above. The registering of the model dataset and the second image data may be based on the second features (e.g., geometrical and/or anatomical features) of the second class of features of the examination region that are mapped at the second level of detail in the model dataset (e.g., the first image data) and the second image data. The second class of features may include all features of the examination region (e.g., all geometrical and/or anatomical features) that are mappable and distinguishable (e.g., identifiable) at the second level of detail and above. For example, the features of the second class of features are not mappable or distinguishable below the second level of detail (e.g., at the first level of detail). Further, the features of the second class of features may include small-scale (e.g., micro-scale or low millimeter-scale) anatomical landmarks of the examination region (e.g., micro-vasculature, such as a network of fine vessels, and/or fibers of fibrotic liver tissue).

Further, the registering of the model dataset and the second image data may include determining a second transformation rule for rigidly and/or deformably transforming (e.g., translating and/or rotating and/or deforming and/or scaling) the model dataset and/or the second image data. The determining of the second transformation rule may include determining a measure for a local pressure and/or deformation and/or twisting state of the second features. In one embodiment, a minimum level of accuracy of the registration between the model dataset and the second image data (e.g., a minimum level of accuracy of the second transformation rule) may be equivalent to the second level of detail. The registering of the model dataset and the second image data may include minimizing a deviation (e.g., a misalignment) between the second features. Hence, the registering of the model dataset and the second image data may include an alignment of the second features at the second level of detail. Further, the registering of the model dataset and the second image data may include applying the second transformation rule to the model dataset (e.g., pre-aligned model dataset) and/or the second image data (e.g., pre-aligned second image data).

The providing of the result image data may include a storing on an electronically readable storage medium and/or a transmitting to a provision unit and/or a displaying of a graphical representation of the result image data by a display unit. In one embodiment, the providing of the result image data includes providing the registered model dataset and/or the registered second image data.

The method may enable a precise and robust registration between the model dataset and the second image data.

In an embodiment of the method, a geometric and/or anatomical model and/or initial image data of the examination region may be received. Further, the generating of the model dataset may include registering the first image data to the geometric and/or anatomical model and/or the initial image data based on further features of the first class of features that are mapped in the first image data and represented in the geometric and/or anatomical model and/or the initial image data at the first level of detail.

The receiving of the geometric and/or anatomical model and/or the initial image data of the examination region (e.g., the subject) may include collecting and/or reading out data from an electronically readable storage medium and/or receiving data from a memory unit (e.g., a database). In one embodiment, the geometric and/or anatomical model of the examination region may include a generic and/or specific representation of the subject (e.g., the examination region) at the first level of detail or above. Further, the geometric and/or anatomical model may include a 2D or 3D representation of geometric and/or anatomical objects of the examination region (e.g., centerlines and/or a vessel segment and/or a vessel tree and/or a mesh model). Further, the initial image data may include a 2D or 3D mapping of the examination region. The initial image data may be received from the at least one medical imaging device for acquiring the first image data and/or second image data or from a different medical imaging device. The medical imaging device for acquiring the initial image data may include a magnetic resonance imaging system (MRI) and/or a positron emission tomography system (PET) and/or an ultrasound system and/or a medical X-ray system and/or a computed tomography system (CT) and/or an optical imaging system (e.g., an endoscope and/or a laparoscope).

The registering of the first image data with the geometric and/or anatomical model and/or the initial image data may be based on the further features (e.g., geometrical and/or anatomical features) of the first class of features of the examination region that are mapped in the first image data and represented (e.g., mapped or modelled) in the geometric and/or anatomical model and/or the initial image data at the first level of detail. Further, the registering of the first image data with the geometric and/or anatomical model and/or the initial image data may include determining a further transformation rule for rigidly and/or deformably transforming (e.g., translating and/or rotating and/or deforming and/or scaling) the geometric and/or anatomical model and/or the initial image data and/or the first image data. In one embodiment, a minimum level of accuracy of the registration of the first image data with the geometric and/or anatomical model and/or the initial image data (e.g., a minimum level of accuracy of the further transformation rule) may be equivalent to the first level of detail. The registering of the first image data with the geometric and/or anatomical model and/or the initial image data may include minimizing a deviation (e.g., a misalignment) between the further features. Hence, the registering of the first image data with the geometric and/or anatomical model and/or the initial image data may include an alignment of the further features at the first level of detail. Further, the registering of the first image data with the geometric and/or anatomical model and/or the initial image data may include applying the further transformation rule to the first image data. In one embodiment, the model dataset may include the registered first image data, and the geometric model, the anatomical model, and/or the initial image data.

The embodiment may employ the geometric and/or anatomical model (e.g., the further features represented in the geometric and/or anatomical model) and/or the initial image data as a 2D or 3D structure for spatially arranging (e.g., reconstructing) the model dataset (e.g., the second features) based on the first image data.

In an embodiment of the method, the second class of features is unique above the first level of detail. Further, the pre-alignment of the model dataset and the second image data may provide a pre-alignment of the second features of the second class of features at the first level of detail for registering the model dataset and the second image data at the second level of detail.

In one embodiment, the second class of features may be unique (e.g., unambiguous) above the first level of detail (e.g., within a spatial extent and/or time span that corresponds to the spatial resolution and/or time resolution characterizing the first level of detail). Conversely, the second class of features may be ambiguous at the first level of detail. As a consequence, for unambiguously aligning the model dataset and the second image data at the second level of detail, the second features of the second class of features are to be pre-aligned at the first level of detail.

The pre-alignment of the model dataset and the second image data may be based on the first features of the first class of features that are mapped at the first level of detail in the model dataset and the second image data. As a consequence of this pre-alignment, the second features of the second class of features, which are mapped at the second level of detail in the model dataset and the second image data, may also be pre-aligned at the first level of detail.

In one embodiment, the pre-alignment between the model dataset and the second image data at the first level of detail may facilitate an unambiguous identification of corresponding mappings of the second features at the second level of detail for the registering of the model dataset and the second image data at the second level of detail. Here, the second features may act as unambiguous fingerprints (e.g., identifiers) between respective mappings in the model dataset and the second image data at the second level of detail.

In an embodiment of the method, the first image data may include a number of first mappings of the examination region, where each of the first mappings maps at least one of the first features. The generating of the model dataset may include reconstructing the model dataset from the first mappings.

In one embodiment, the first mappings may map the examination region with at least partially (e.g., completely) different acquisition geometries (e.g., different mapping directions and/or mapping positions) and/or at different first acquisition times. Further, the first mappings may map at least partially different or at least partially overlapping sections of the examination region.

Further, the generating of the model dataset may include a 2D or 3D reconstruction based on the first mappings of the examination region. For example, the model dataset may be reconstructed from the first mappings by using features of the first class and/or second class of features as scaffold that features are mapped in at least two of the first mappings (e.g., a vasculature). The reconstruction of the model dataset from the first mappings may be based on the acquisition geometries of the first mappings (e.g., relative to each other and/or relative to the subject). Alternatively or in addition, the reconstruction of the model dataset from the first mappings may be based on common features of the examination region mapped in at least two of the first mappings. Thereby, a better (e.g., more precise and/or more comprehensive) mapping of the examination region may be achieved in the model dataset.

In an embodiment of the method, the first image data maps a number of at least partially different sections of the examination region of the subject. Further, the registering of the model dataset and the second image data may include identifying at least one of the first mappings in the model dataset based on the pre-alignment of the model dataset and the second image data. The at least one first mapping corresponds with the mapping of the common part of the examination region in the second image data.

In one embodiment, the first image data may map a number of at least partially (e.g., completely) different sections (e.g., spatial sections) of the examination region of the subject. Further, each of the at least partially different sections may include a 2D part (e.g., a slice) or a 3D part (e.g., a volume) of the examination region. In one embodiment, the number of at least partially different sections combined cover the examination region. The at least partially different sections may be of different or equal geometrical shape and/or size.

The pre-aligning of the model dataset and the second image data at the first level of detail may include determining a spatial and/or time correspondence between the mappings of the common part of the examination region in the model dataset and the second image data. The spatial or time correspondence between the mappings of the common part of the examination region in the model dataset and the second image data may include a spatial and/or time correspondence between image points of the model dataset and the second image dataset mapping the common part of the examination region.

Since the model dataset is generated (e.g., reconstructed) based on the first image data, the at least one first mapping may be identified based on the pre-alignment of the model dataset and the second image data (e.g., the spatial and/or time correspondence between the mappings of the common part of the examination region in the model dataset and the second image data). In one embodiment, the mappings of the features of the second class of features in the first image data, which are non-unique (e.g., ambiguous) below the first level of detail, may be narrowed to the mappings of the features of the second class of features within the identified at least one first mapping. Further, these mappings of the features of the second class of features within the identified at least one first mapping may include the second features that are used for registering the model dataset and the second image data. Thereby, a more robust and efficient registration between the model dataset and the second image data may be achieved.

In an embodiment of the method, the first mappings may each map the common part of the examination region with at least partially different acquisition geometries in 2D. Further, the generating of the model dataset may include reconstructing the mapping of at least part of the first features and/or second features in the model dataset from at least two of the first 2D mappings.

The first image data may include a number of first 2D mappings (e.g., projection mappings and/or slice mappings) of the common part of the examination region. Further, the number of first 2D mappings may feature at least partially (e.g., completely) different acquisition geometries (e.g., different mapping directions, such as angulations) and/or different mapping positions and/or different field-of-view dimensions and/or shapes. In one embodiment, the first 2D mappings may map the common part of the examination region from at least partially different mapping directions and/or mapping positions. Further, the first 2D mappings may map at least partially (e.g., completely) different projections and/or slices of the common part of the examination region.

Further, the mapping of the at least one of the first features and/or second features (e.g., of all first features and/or second features) in the first image data may be reconstructed from at least two of the first 2D mappings. If the second image data maps the common part of the examination region in 3D, the reconstruction of the mapping of the at least one of the first features and/or second features may include a 3D reconstruction based on the at least two of the first 2D mappings (e.g., a back-projection of the at least two of the first 2D mappings). Alternatively, if the second image data may include at least one second 2D mapping (e.g., a number of second 2D mappings) of the common part of the examination region, where the acquisition geometries of the first 2D mappings and the at least one second 2D mapping of the common part of the examination region are at least partially different. The reconstruction may include a 3D reconstruction of a temporary dataset based on the at least two of the first 2D mappings (e.g., a back-projection of the at least two of the first 2D mappings) and a subsequent 2D reconstruction (e.g., a forward projection) based on the acquisition geometry of the second image data and the temporary dataset.

Thereby, a more robust registration between the model dataset and the second image data may be achieved.

In an embodiment of the method, the second image data may include a number of second 2D mappings of the common part of the examination region with at least partially different acquisition geometries. Further, the mapping of at least part of the first features and/or second features in the second image data is reconstructed from at least two of the second 2D mappings.

The second image data may include a number of second 2D mappings (e.g., projection mappings and/or slice mappings) of the common part of the examination region. Further, the number of second 2D mappings may feature at least partially (e.g., completely) different acquisition geometries (e.g., different mapping directions, such as angulations) and/or different mapping positions and/or different field-of-view dimensions and/or shapes. In one embodiment, the second 2D mappings may map the common part of the examination region from at least partially different mapping directions and/or mapping positions. Further, the second 2D mappings may map at least partially (e.g., completely) different projections and/or slices of the common part of the examination region.

Further, the mapping of the at least one of the first features and/or second features (e.g., of all first and/or second features) in the second image data may be reconstructed from at least two of the second 2D mappings. If the first image data maps the common part of the examination region in 3D, the reconstruction of the mapping of the at least one of the first features and/or second features may include a 3D reconstruction based on the at least two of the second 2D mappings (e.g., a back-projection of the at least two of the second 2D mappings). Alternatively, the first image data may include at least one first 2D mapping (e.g., a number of first 2D mappings) of the common part of the examination region, where the acquisition geometries of the at least one first 2D mapping and the second 2D mappings of the common part of the examination region are at least partially different. The reconstruction may include a 3D reconstruction of a further temporary dataset based on the at least two of the second 2D mappings (e.g., a back-projection of the at least two of the second 2D mappings) and a subsequent 2D reconstruction (e.g., a forward projection) based on the acquisition geometry of the first image data and the further temporary dataset.

Thereby, a more robust registration between the model dataset and the second image data may be achieved.

In an embodiment of the method, the common part of the examination region may include a first part of an anatomical object. Further, the second image data may, for example, exclusively map a second part of the anatomical object that is not mapped in the model dataset. In addition, the registering of the model dataset and the second image data may include determining a first deformation rule for the mapping of the first part of the anatomical object in the second image data based on the second features. Further, the registering of the model dataset and the second image data may include determining a second deformation rule for the mapping of the second part of the anatomical object in the second image data by extrapolating the first deformation rule. In addition, the registering of the model dataset and the second image data may include applying the first deformation rule and the second deformation rule to the second image data.

The anatomical object may include an organ (e.g., a liver and/or a kidney and/or a hollow organ) and/or a tissue (e.g., a tumor). In one embodiment, the first part of the anatomical object may be commonly mapped in the model dataset and the second image data. The first part may include a spatial section of the anatomical object. Further, the second part of the anatomical object may be mapped in the second image data but not in the model dataset. Likewise, the second part of the anatomical object may include a further spatial section of the anatomical object. In one embodiment, the first part and the second part of the anatomical object combined may cover the anatomical object. Further, the first part and the second part of the anatomical object may be spatially adjacent to each other.

The determining of the first deformation rule for the mapping of the first part of the anatomical object in the second image data may include aligning the second features mapped in the model dataset and the second image data at the second level of detail. In one embodiment, at least one (e.g., a number or all) of the second features are geometrical and/or anatomical features of the first part of the anatomical object. The first deformation rule may include a rule (e.g., instructions) for a rigid and/or deformable transformation (e.g., a translation and/or rotation and/or deformation and/or scaling) of the mapping of the first part of the anatomical object in the model dataset and/or the second image data in order to align the second features of the first part of the anatomical object.

The determining of the second deformation rule for the mapping of the second part of the anatomical object in the second image data may include extrapolating the first deformation rule. This extrapolation may be based on a geometrical relation (e.g., a position and/or orientation) and/or an anatomical relation (e.g., a tissue and/or an organ parameter, such as an elasticity and/or a tissue composition and/or a vascularization) between the first part and the second part of the anatomical object. Alternatively or in addition, the extrapolation of the first deformation rule may be based on a biomechanical model of the anatomical object that may be inferred from the model dataset and/or the second image data. As a consequence, the rule (e.g., the instructions) for the rigid and/or deformable transformation of the first image data and/or the second image data may be extrapolated to the mapping of the second part of the anatomical object in the second image data.

The embodiment of the method may enable an extension of the registration between the mappings of the common part of the examination region (e.g., the first part of the anatomical object) in the model dataset and the second image data to the second part of the anatomical object, which is exclusively mapped in the second image data.

In an embodiment of the method, the providing of the result image data may include mixing and/or overlaying and/or superimposing the registered second image data with the model dataset. Alternatively, the providing of the result image data may include mixing and/or overlaying and/or superimposing the registered model dataset with the second image data.

The providing of the result image may include a (e.g., weighted and/or regional) mixing (e.g., an adding and/or a multiplying) and/or an overlaying and/or superimposing (e.g., partially transparent) of the registered second image data with the model dataset. Alternatively, the providing of the result image may include a mixing (e.g., weighted and/or regional and/or global and/or point-wise; an adding and/or a multiplying) and/or an overlaying and/or superimposing (e.g., partially transparent) of the registered model dataset with the second image data.

Thereby, the result image may include aligned features of the model dataset and the second image data.

In a second aspect, the present embodiments include a provision unit that is configured to execute a method for providing result image data according to the present embodiments.

The provision unit may include a calculation unit, a memory unit, and/or an interface. Further, the provision unit may be configured to execute an embodiment of the method for providing result image data according to the present embodiments, where the calculation unit, the memory unit, and/or the interface are configured to execute the respective acts. For example, the interface may be configured to receive the first image data and the second image data. Further, the interface may be configured to provide the result image data. Further, the calculation unit and/or the memory unit may be configured to generate the model dataset, to pre-align and to register the model dataset and the second image data.

All remarks and advantages laid out above regarding the method for providing result image data also apply to the provision unit according to the present embodiments and vice versa. Additional features, advantages, and/or alternative embodiments laid out above regarding the method for providing result image data may also be transferred to embodiments of the provision unit according to the present embodiments and vice versa.

In a third aspect, the present embodiments include a system including a provision unit according to the present embodiments, at least one medical imaging device, and a display unit. The at least one medical imaging device is configured to acquire first image data of a subject including an examination region, where the first image data maps the examination region. In addition, the at least one medical imaging device is configured to acquire second image data of the subject, where the first image data and the second image data map at least a common part of the examination region at a second level of detail. The provision unit is configured to generate a model dataset based on the first image data. Further, the provision unit is configured to pre-align the model dataset and the second image data at a first level of detail below the second level of detail based on first features of a first class of features of the examination region that are mapped at the first level of detail in the model dataset and the second image data. Alternatively or in addition, the provision unit is configured to pre-align the model dataset and the second image data at the first level of detail based on an acquisition geometry of the second image data with respect to the subject (e.g., the examination region). Further, the provision unit is configured to register the model dataset and the second image data at the second level of detail based on second features of a second class of features of the examination region that are mapped at the second level of detail in the model dataset and the second image data. The second class of features is mappable at the second level of detail or above. In addition, the provision unit is configured to provide the registered second image data and/or the registered model dataset as result image data. Further, the display unit is configured to display a graphical representation of the result image data.

All remarks and advantages laid out above regarding the method for providing result image data also apply to the system according to the present embodiments and vice versa. Additional features, advantages, and/or alternative embodiments laid out above regarding the method for providing result image data may also be transferred to embodiments of the system according to the present embodiments and vice versa.

The at least one medical imaging device may include a magnetic resonance imaging system (MRI) and/or a positron emission tomography system (PET) and/or an ultra-sound system and/or a medical X-ray system and/or a computed tomography system (CT) and/or an optical imaging system as an imaging modality.

The display unit may include a display and/or monitor and/or screen and/or a projector that is configured to visually display the graphical representation of the result image data.

In an embodiment of the system, the system may include a first medical imaging device and a second medical imaging device, where the first medical imaging device and the second medical imaging device are different imaging modalities. Further, the first medical imaging device may be configured to acquire the first image data. Further, the second medical imaging device may be configured to acquire the second image data.

In one embodiment, the first data and the second image data may each be acquired by a dedicated medical imaging device (e.g., the first medical imaging device and the second medical imaging device). As a consequence of the different imaging modalities, the first features and/or the second features may be mapped differently in the first image data and the second image data (e.g., with different intensity and/or contrast characteristics). In one embodiment, the provision unit may be configured to identify the first features and/or the second features based on geometric characteristics that are commonly mapped in the first image data and the second image data (e.g., a shape and/or contour and/or a pattern).

In an embodiment of the system, the first medical imaging device may be an extracorporeal imaging modality. Further, the second medical imaging device may be an endoluminal imaging modality.

The first medical imaging device may be configured to acquire the first image data from outside the subject (e.g., by detecting a transmitted and/or reflected portion of acoustic and/or electromagnetic waves after an interaction with the examination region). The second medical imaging device may be a diagnostic and/or surgical instrument (e.g., an endoscope and/or laparoscope and/or bronchoscope and/or catheter) that is configured to be at least partially inserted into the subject (e.g., a cavity and/or hollow organ of the subject). In one embodiment, the second medical imaging device may be configured to acquire the second image data from within the subject (e.g., from within the examination region).

In a fourth aspect, the present embodiments include a computer program product. The computer program product may include a computer program. The computer program according to the present embodiments may, for example, be directly loaded into a memory of a provision unit and includes program means to perform the acts of a method for providing result image data according to the present embodiments if the computer program is executed in the provision unit. The computer program may be stored on an electronically readably storage medium (e.g., a non-transitory computer-readable storage medium) that thus includes electronically readable control information (e.g., instructions) stored thereon. The control information includes at least a computer program according to the present embodiments and is configured such that the control information executes a method for providing result image data according to the present embodiments when the storage medium is used in a provision unit. The electronically readably storage medium according to the present embodiments may be a non-transient medium (e.g., a CD-ROM). The computer program product may include further elements, such as a documentation and/or additional components (e.g., hardware dongles for using the software).

In addition, the present embodiments may also emanate from an electronically readable storage medium that stores electronically readable control information such that the control information executes a method for providing result image data according to the present embodiments when the storage medium is used in a provision unit.

A largely software-based implementation bears the advantage that previously used provision units may be easily upgraded via a software update in order to execute a method for providing result image data according to the present embodiments.

DETAILED DESCRIPTION

Figure 1:
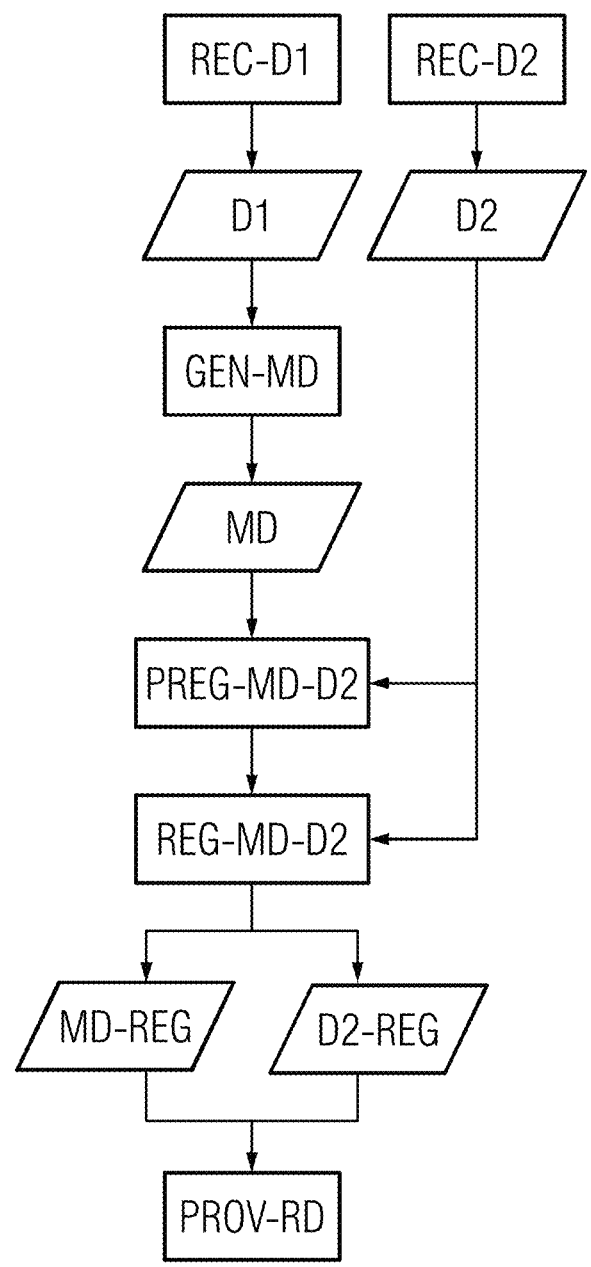
FIGS. 1 to 5 show schematic representations of different embodiments of a method for providing result image data.

FIG. 1 shows a schematic representation of an embodiment of a method for providing PROV-RD result image data. In a first act, pre-acquired first image data D1 of a subject including an examination region may be received REC-D1. Further, the first image data D1 may map the examination region. In a further act, a model dataset MD may be generated GEN-MD based on the first image data D1. In a further act, pre-acquired second image data D2 of the subject may be received REC-D2. Further, the model dataset MD and the second image data D2 may map at least a common part of the examination region at a second level of detail. In a further act, the model dataset MD and the second image data D2 may be pre-aligned PREG-MD-D2 at a first level of detail below the second level of detail based on first features of a first class of features of the examination region that are mapped at the first level of detail in the model dataset MD and the second image data D2. Alternatively or in addition, the model dataset MD and the second image data D2 may be pre-aligned PREG-MD-D2 at the first level of detail based on an acquisition geometry of the second image data D2 with respect to the subject (e.g., the examination region). In a further act, the model dataset MD and the second image data D2 may be registered REG-MD-D2 at the second level of detail based on second features of a second class of features of the examination region that are mapped at the second level of detail in the model dataset MD and the second image data D2. In one embodiment, the second class of features may be mappable at the second level of detail or above. In a further act, the registered second image data D2-REG and/or the registered model dataset MD-REG may be provided PROV-RD as the result image data.

In one embodiment, the second class of features may be unique above the first level of detail. Further, the pre-alignment PREG-MD-D2 of the model dataset MD and the second image data D2 may provide a pre-alignment of the second features of the second class of features at the first level of detail for the registering REG-MD-D2 of the model dataset MD and the second image data D2 at the second level of detail. The second features may act as unambiguous fingerprints (e.g., identifiers) between respective mappings in the model dataset MD and the second image data D2 at the second level of detail. A spatial circumference of the uniqueness of the second class of features may depend on a level of accuracy of the pre-alignment PREG-MD-D2 between the model dataset MD and the second image data D2 (e.g., the first level of detail). For example, if the pre-alignment PREG-MD-D2 is spatially accurate by 2 cm, the second class of features is to be unique within a spatial circumference (e.g., a search space, of 2 cm). Alternatively, multiple non-unique features of the second class of features may be combined based on combinatoric methods to achieve uniqueness within the spatial circumference. The spatial circumference of the uniqueness of the second class of features may be determined by matching each feature of the second class of features to all other features of the second class of features in the examination region and measuring a spatial distance between the matching features. Alternatively, the spatial circumference of the uniqueness of the second class of features may be determined by statistical analysis of its complexity. Further, the spatial circumference of the uniqueness of the second class of features may become larger with a more complex geometry and/or pattern of the features of the second class of features.

Further, the providing PROV-RD of the result image data may include mixing and/or overlaying and/or superimposing the registered second image data D2-REG with the model dataset MD. Alternatively, the providing PROV-RD of the result image data may include mixing and/or overlaying and/or superimposing the registered model dataset MD-REG with the second image data D2.

Figure 2:
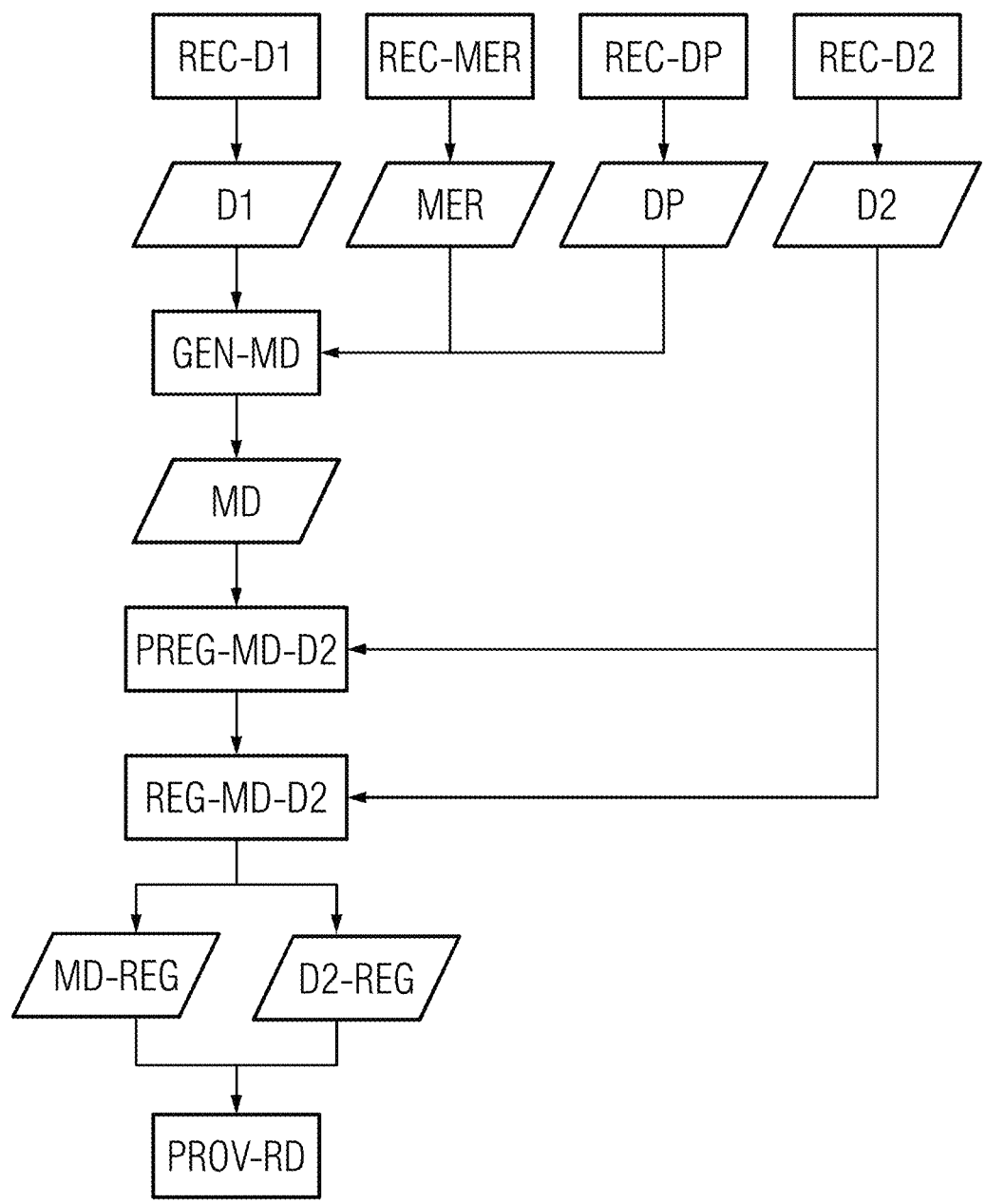

FIG. 2 shows a schematic representation of a further embodiment of a method for providing PROV-RD result image data. A geometric and/or anatomical model MER and/or initial image data DP of the examination region may be received REC-MER, REC-DP. Further, the generating GEN-MD of the model dataset MD may include registering the first image data D1 to the geometric and/or anatomical model MER and/or the initial image data DP based on further features of the first class of features that are mapped in the first image data D1 and represented in the geometric and/or anatomical model MER and/or the initial image data DP at the first level of detail.

Figure 3:
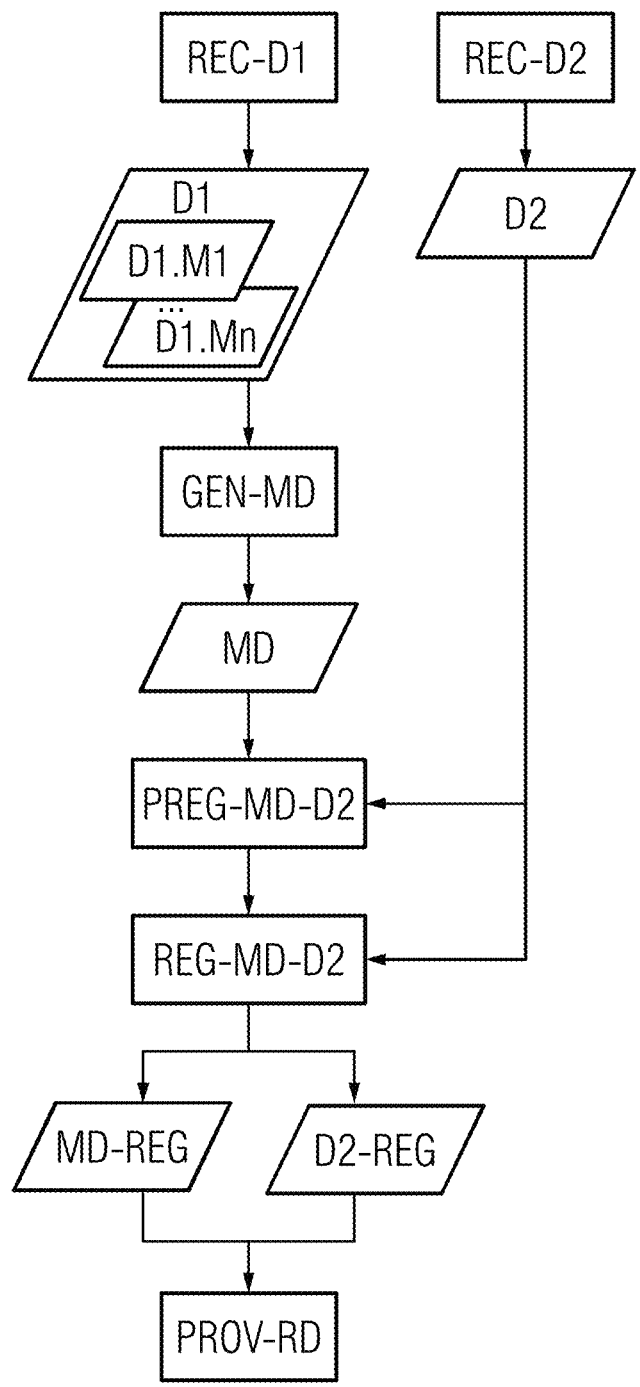

FIG. 3 shows a schematic representation of a further embodiment of a method for providing PROV-RD result image data. The first image data D1 may include a number of first mappings D1.M1 to D1.Mn of the examination region. Further, the generating GEN-MD of the model dataset MD may include reconstructing the model dataset MD from the first mappings D1.M1 to D1.Mn.

In one embodiment, the first mappings D1.M1 to D1.Mn may map a number of at least partially different sections of the examination region of the subject. Further, the registering REG-MD-D2 of the model dataset MD and the second image data D2 may include identifying at least one of the first mappings in the model dataset MD based on the pre-alignment PREG-MD-D2 of the model dataset MD and the second image data D2. The at least one first mapping corresponds with the mapping of the common part of the examination region in the second image data D2.

Figure 4:
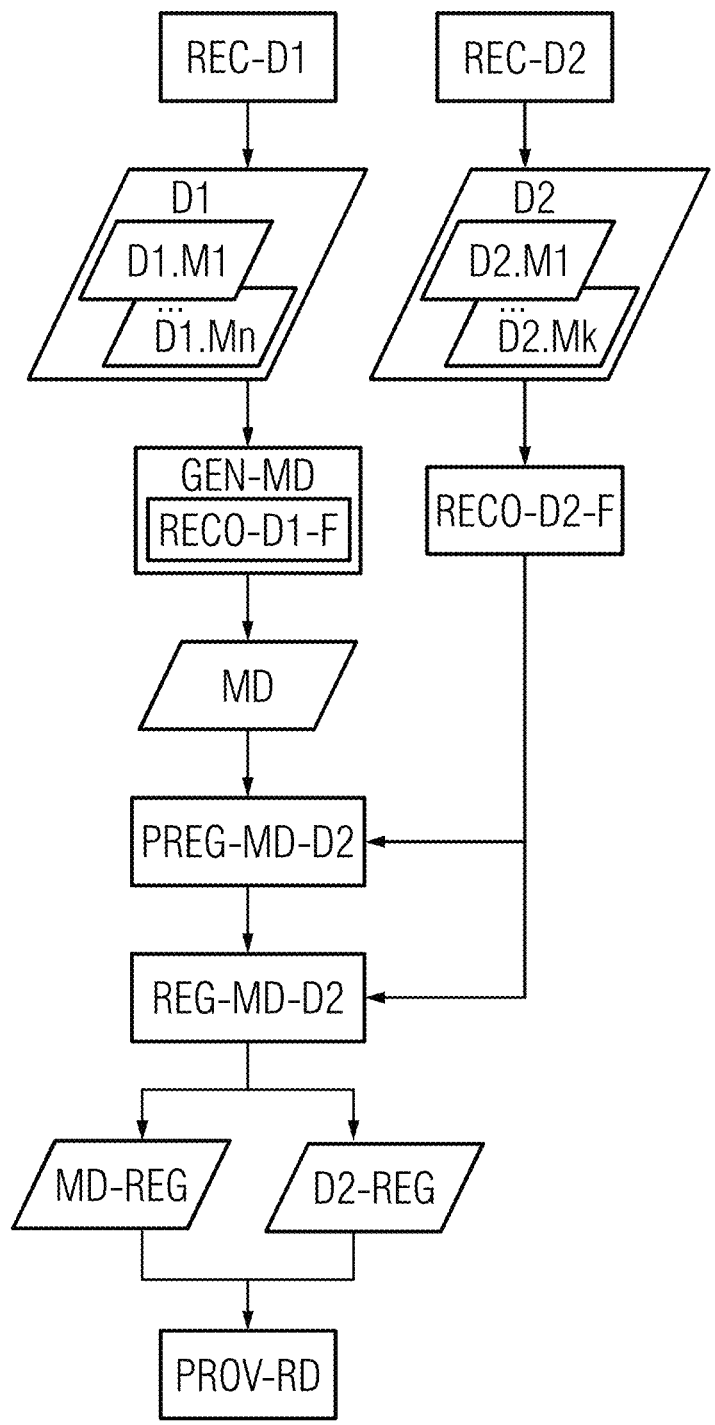

FIG. 4 shows a schematic representation of a further embodiment of a method for providing PROV-RD result image data. The first mappings D1.M1 to D1.Mn each map the common part of the examination region with at least partially different acquisition geometries in 2D. In addition, the generating GEN-MD of the model dataset MD may include reconstructing RECO-D1-F the mapping of at least part of the first features and/or second features in the model dataset MD from at least two of the first mappings D1.M1 to D1.Mn.

In addition, the second image data D2 may include a number of second 2D mappings D2.M1 to D2.Mk of the common part of the examination region with at least partially different acquisition geometries. Further, the mapping of at least part of the first features and/or second features in the second image data D2 may be reconstructed RECO-D2-F from at least two of the second 2D mappings D2.M1 to D2.Mk.

Figure 5:
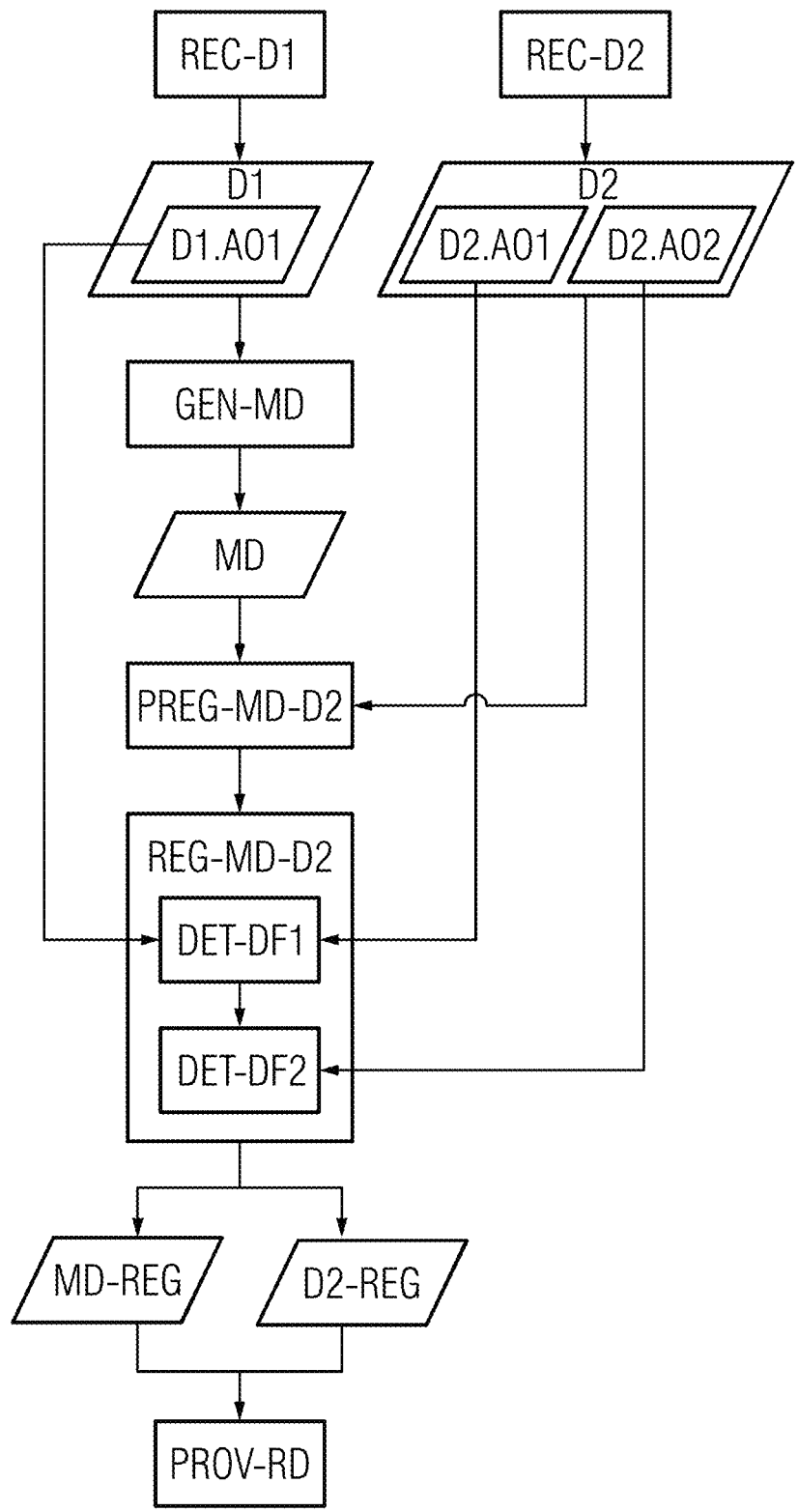

FIG. 5 shows a schematic representation of a further embodiment of a method for providing PROV-RD result image data. The examination region may include an anatomical object. Further, the common part of the examination region may include a first part of the anatomical object. Hence, the first D1 and the second image data D2 may each map the first part of the anatomical object D1.AO1 and D2.AO1. Further, the second image data D2 may map a second part of the anatomical object D2.AO2. The second part D2.AO2 is not mapped in the model dataset MD. For example, the second part of the anatomical object D2.AO2 is not comprised by the common part of the examination region. In one embodiment, the registering REG-MD-D2 of the model dataset MD and the second image data D2 may include determining DET-DF1 a first deformation rule for the mapping of the first part of the anatomical object in the second image data D2.AO1 based on the second features. Further, the registering REG-MD-D2 of the model dataset and the second image data D2 may include determining DET-DF2 a second deformation rule for the mapping of the second part of the anatomical object in the second image data D2.AO2 by extrapolating the first deformation rule. Further, the registering REG-MD-D2 of the model dataset and the second image data D2 may include applying the first deformation rule and the second deformation rule to the second image data D2.

Figure 6:
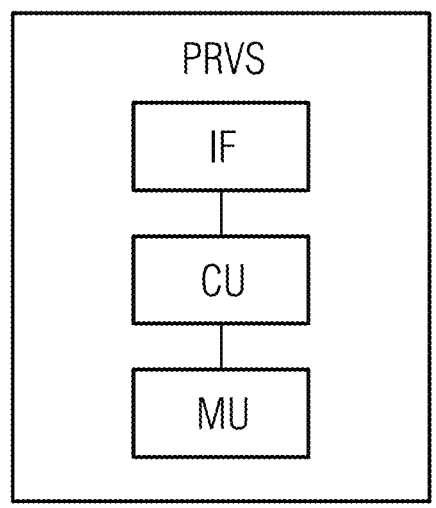
FIG. 6 shows a schematic representation of an embodiment of a provision unit.

FIG. 6 shows a schematic representation of an embodiment of a provision unit PRVS. The provision unit PRVS may include a calculation unit CU, a memory unit MU, and/or an interface IF. Further, the provision unit PRVS may be configured to execute an embodiment of the method for providing PROV-RD result image data according to the present embodiments. The calculation unit CU, the memory unit MU, and/or the interface IF are configured to execute the respective acts. For example, the interface IF may be configured to receive the first image data and the second image data REC-D1 and REC-D2. Further, the interface IF may be configured to provide PROV-RD the result image data. Further, the calculation CU and/or the memory unit MU may be configured to generate GEN-MD the model dataset MD, to pre-align PREG-MD-D2 and to register REG-MD-D2 the model dataset MD and the second image data D2.

Figure 7:
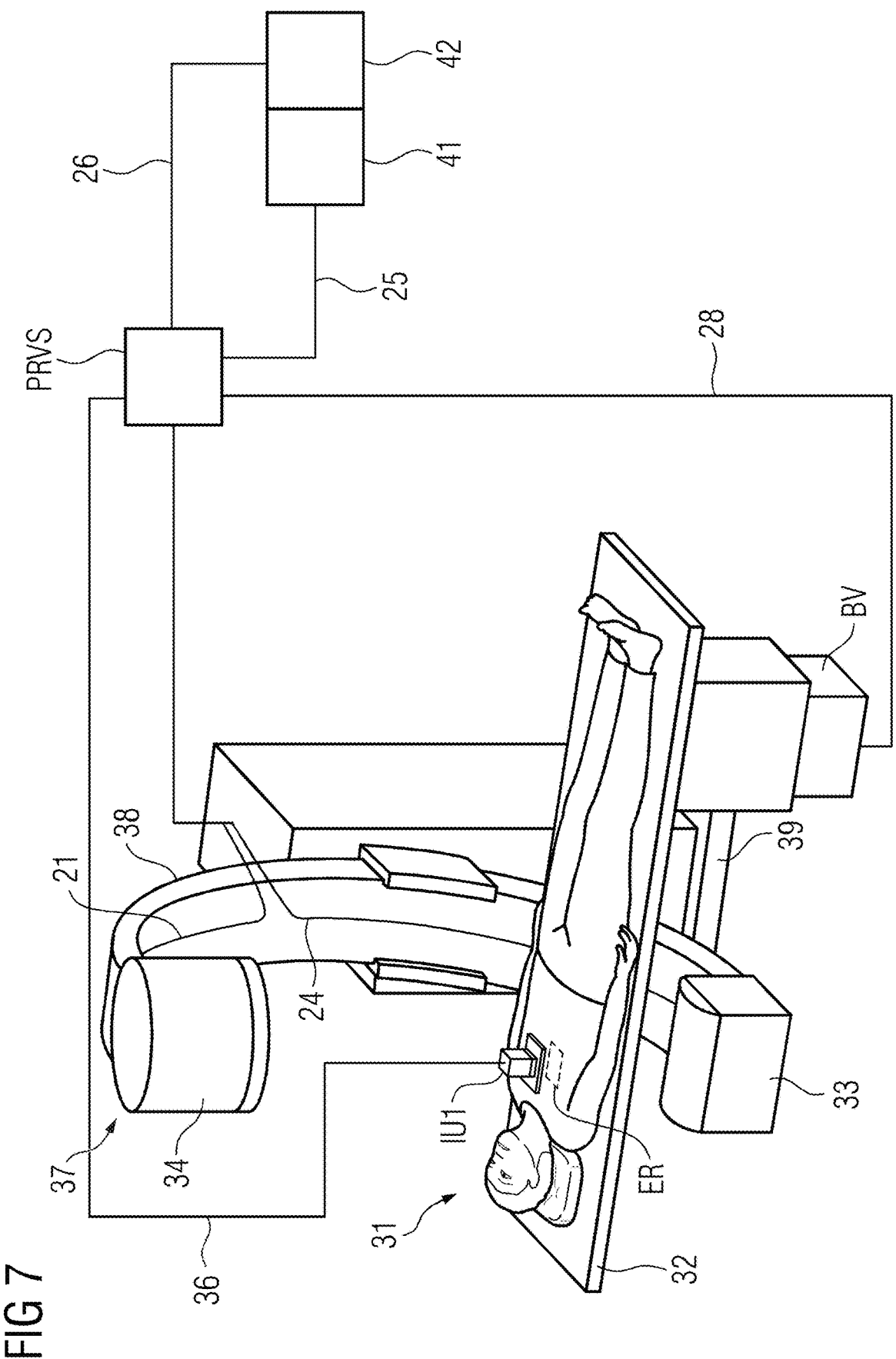
FIGS. 7 and 8 show schematic representations of different embodiments of a system.

FIG. 7 shows a schematic representation of an embodiment of a system, where the system includes a provision unit PRVS according to the present embodiments, a first medical imaging device, a second medical imaging device, and a display unit 41. The first medical imaging device and the second medical imaging device may be different imaging modalities. For example, the first medical imaging device may be embodied as a medical C-arm X-ray system 37 that may be configured to acquire the first image data D1 of the subject 31 including the examination region ER. Further, the second medical imaging device may be embodied as a medical ultrasound device IU1 that is configured to acquire the second image data D2 of the subject 31. The first image data D1 and the second image data D2 may map at least the common part of the examination region ER at the second level of detail.

The medical C-arm X-ray system 37 may include an X-ray detector 34 and an X-ray source 33 that may be mounted to a C-arm 38 of the C-arm X-ray system 37 such that the X-ray detector 34 and the X-ray source 33 are movable (e.g., rotatable) around at least one axis. In addition, the medical C-arm X-ray system 37 may include a motion unit 39 (e.g., including at least a wheel and/or rail and/or robotic system) that permits a spatial motion of the medical C-arm X-ray system 37. For the acquisition of the first image data D1 of the subject 31 (e.g., including at least one projection image of the of the subject 31), the provision unit PRVS may send a signal 24 to the X-ray source 33. Consequently, the X-ray source 33 may emit an X-ray bundle (e.g., a cone-beam and/or a fan-beam and/or a parallel-beam). When the X-ray bundle impinges on a surface of the X-ray detector 34 after an interaction between the X-ray bundle and the region under examination RE of the subject 31, the X-ray detector 34 may send a signal 21 to the provision unit PRVS that is dependent on the detected X-rays. Based on the signal 21, the provision unit PRVS may be configured to receive first image data D1.

The medical ultrasound device UI1 may include at least one ultrasound transducer. For example, the medical ultrasound device UI1 may include multiple ultrasound transducers that may be spatially arranged in a loop (e.g., an ellipse or circle), a row, an array and/or a matrix. The at least one ultrasound transducer may be configured to emit a field of ultrasound into the subject 31 (e.g., the examination region ER) by a coupling medium (e.g., a gel). Further, the at least one ultrasound transducer may be configured to detect a reflected and/or transmitted portion of the ultrasound field after an interaction between the ultrasound field and the subject 31 (e.g., the examination region ER). In one embodiment, the medical ultrasound device UI1 may be configured to provide a signal 36 depending on the received portion of the ultrasound field. Based on the signal 36, the provision unit PRVS may be configured to receive second image data D2.

The provision unit PRVS may be configured to generate the model dataset MD based on the first image data D1. Further, the provision unit PRVS may be configured to pre-align PREG-MD-D2 the model dataset MD and the second image data D2 at a first level of detail below the second level of detail based on first features of the first class of features of the examination region ER that are mapped at the first level of detail in the model dataset MD and the second image data D2. Alternatively or in addition, the provision unit PRVS may be configured to pre-align PREG-MD-D2 the model dataset MD and the second image data D2 at the first level of detail based on an acquisition geometry of the second image data D2 with respect to the subject 31 (e.g., the examination region ER). In addition, the provision unit PRVS may be configured to register REG-MD-D2 the model dataset MD and the second image data D2 at the second level of detail based on second features of a second class of features of the examination region ER that are mapped at the second level of detail in the model dataset MD and the second image data D2. In one embodiment, the second class of features is mappable at the second level of detail or above. Further, the provision unit PRVS may be configured to provide PROV-RD the registered second image data D2-REG and/or the registered model dataset MD-REG as result image data. For example, the provision unit PRVS may be configured to provide PROV-RD the registered second image data D2-REG and/or the registered model dataset MD-REG as result image data to the display unit 41 via a signal 25.

The display unit 41 may include a display and/or monitor that is configured to display the graphical representation of the result image data. The system may further include an input unit 42 (e.g., a keyboard). The input unit 42 may be integrated into the display unit 41 (e.g., as a capacitive and/or resistive touch display). The input unit 42 may be configured to capture a user input (e.g., from a medical staff). Further, the provision unit PRVS may be configured to receive the user input from the input unit 42 via a signal 26. The provision unit PRVS may be configured to control the acquisition of the first image data D1 and the further image data D2 by the medical C-arm X-ray system 37 based on the user input (e.g., based on the signal 26).

Figure 8:
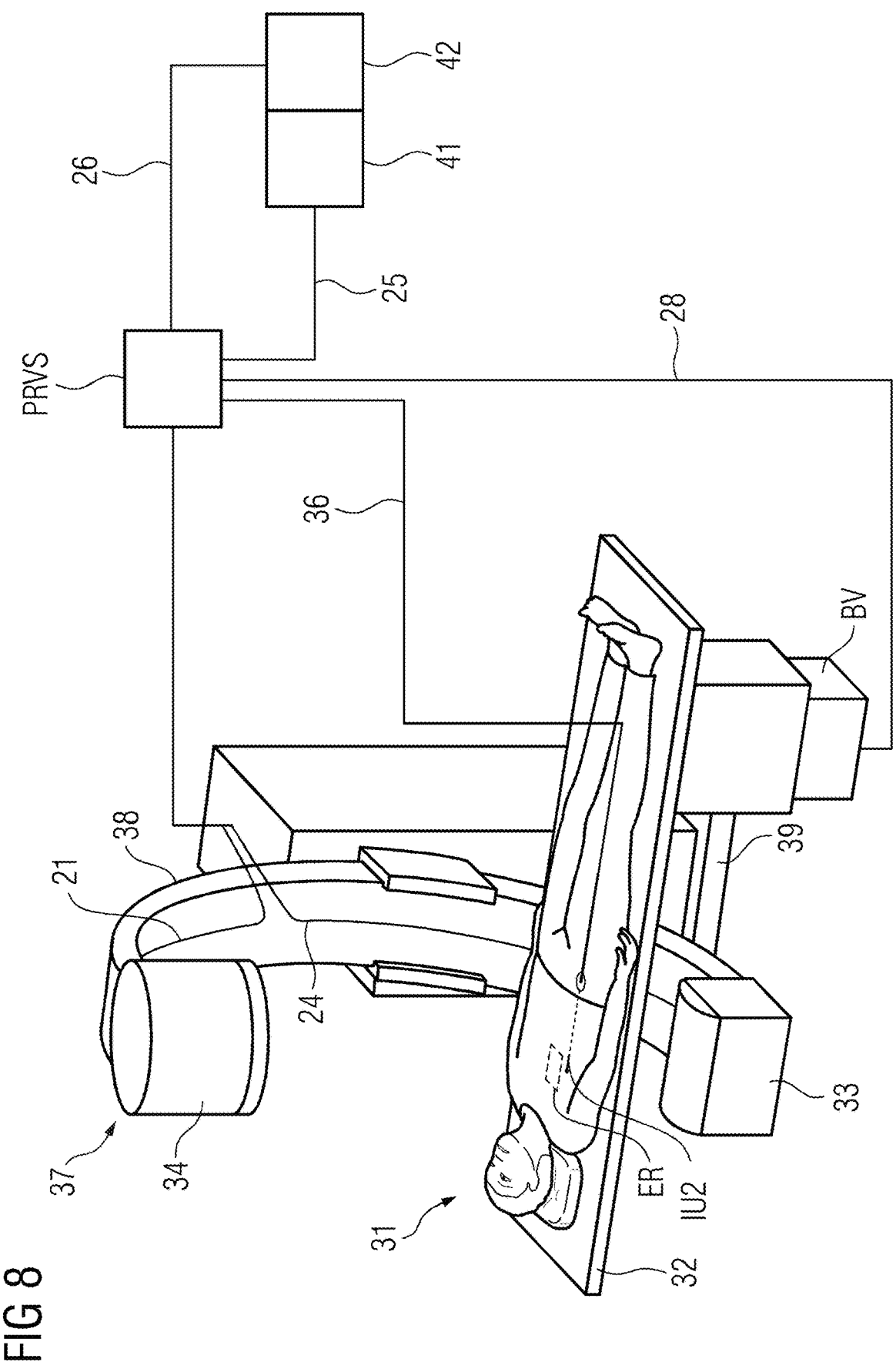

FIG. 8 shows a schematic representation of a further embodiment of a system. The first medical imaging device may be an extracorporeal imaging modality. Like illustrated in FIG. 7, the first medical imaging device may be embodied as the medical C-arm X-ray system 37 that may be configured to acquire the first image data D1 from outside the subject. Further, the second medical imaging device IU2 may be embodied as an endoluminal imaging modality (e.g., a diagnostic and/or surgical instrument, such as an endoscope and/or laparoscope and/or bronchoscope and/or catheter) that is configured to be at least partially inserted into the subject 31 (e.g., a cavity and/or hollow organ of the subject 31). The second medical imaging device IU2 may be configured to acquire the second image data D2 from within the subject 31 (e.g., from within the examination region ER and/or adjacent to the examination region ER). The second imaging device IU2 may be configured to provide the second image data D2 to the provision unit PRVS via the signal 36.

Although the present invention has been described in detail with reference to embodiments, the present invention is not limited by the disclosed examples from which the skilled person is able to derive other variations without departing from the scope of the invention. In addition, the utilization of indefinite articles such as "a" and/or "an" does not exclude multiples of the respective features. Further, terms such as "unit" and "element" do not exclude that the respective components may include multiple interacting sub-components, where the sub-components may further be spatially distributed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing result image data, the method comprising:
   receiving first image data of a subject including an examination region, the first image data being pre-acquired, wherein the first image data maps the examination region;
   generating a model dataset based on the first image data;
   receiving second image data of the subject that is pre-acquired, wherein the model dataset and the second image data map at least a common part of the examination region at a second level of detail;
   pre-aligning the model dataset and the second image data at a first level of detail below the second level of detail based on:
      first features of a first class of features of the examination region that are mapped at the first level of detail in the model dataset and the second image data;
      an acquisition geometry of the second image data with respect to the subject; or
      a combination thereof;
   registering the model dataset and the second image data at the second level of detail based on second features of a second class of features of the examination region that are mapped at the second level of detail in the model dataset and the second image data, wherein the second class of features is mappable at the second level of detail or above; and
   providing the registered second image data, the registered model dataset, or the registered second image data and the registered model dataset as the result image data.

2. The method of claim 1, further comprising receiving a geometric, anatomical, or geometric and anatomical model, initial image data, or a combination thereof of the examination region,
   wherein the generating of the model dataset comprises registering the first image data to the geometric, anatomical, or geometric and anatomical model, the initial image data, or the combination thereof based on further features of the first class of features that are mapped in the first image data and represented in the geometric, anatomical, or geometric and anatomical model, the initial image data, or the combination thereof at the first level of detail.

3. The method of claim 1, wherein the second class of features is unique above the first level of detail, and
   wherein the pre-alignment of the model dataset and the second image data provides a pre-alignment of the second features of the second class of features at the first level of detail for registering the model dataset and the second image data at the second level of detail.

4. The method of claim 1, wherein the first image data comprises a number of first mappings of the examination region, and wherein the generating of the model dataset comprises reconstructing the model dataset from the first mappings.

5. The method of claim 4, wherein the first mappings map a number of at least partially different sections of the examination region of the subject, and
wherein the registering of the model dataset and the second image data comprises identifying at least one of the first mappings in the model dataset based on the pre-alignment of the model dataset and the second image data, the at least one first mapping corresponding with the mapping of the common part of the examination region in the second image data.

6. The method of claim 4, wherein each of the first mappings map the common part of the examination region with at least partially different acquisition geometries in two-dimensions (2D), and
wherein the generating of the model dataset comprises reconstructing the mapping of at least part of the first features, the second features, or the first features and the second features in the model dataset from at least two of the first mappings.

7. The method of claim 1, wherein the second image data comprises a number of second two-dimensional (2D) mappings of the common part of the examination region with at least partially different acquisition geometries, and
wherein the mapping of at least part of the first features, the second features, or the first features and the second features in the second image data is reconstructed from at least two of the second 2D mappings.

8. The method of claim 1, wherein the common part of the examination region comprises a first part of an anatomical object,
wherein the second image data maps a second part of the anatomical object, the second part not being mapped in the model dataset, and
wherein the registering of the model dataset and the second image data comprises:
determining a first deformation rule for the mapping of the first part of the anatomical object in the second image data based on the second features;
determining a second deformation rule for the mapping of the second part of the anatomical object in the second image data, the determining of the second deformation rule comprising extrapolating the first deformation rule; and
applying the first deformation rule and the second deformation rule to the second image data.

9. The method of claim 1, wherein the providing of the result image data comprises mixing, overlaying, superimposing, or any combination thereof of:
the registered second image data with the model dataset; or
the registered model dataset with the second image data.

10. A provision unit for providing result image data, the provision unit comprising:
a processor configured to:
receive first image data of a subject including an examination region, the first image data being pre-acquired, wherein the first image data maps the examination region;
generate a model dataset based on the first image data;
receive second image data of the subject that is pre-acquired, wherein the model dataset and the second image data map at least a common part of the examination region at a second level of detail;
pre-align the model dataset and the second image data at a first level of detail below the second level of detail based on:
first features of a first class of features of the examination region that are mapped at the first level of detail in the model dataset and the second image data;
an acquisition geometry of the second image data with respect to the subject; or
a combination thereof;
register the model dataset and the second image data at the second level of detail based on second features of a second class of features of the examination region that are mapped at the second level of detail in the model dataset and the second image data, wherein the second class of features is mappable at the second level of detail or above; and
provide the registered second image data, the registered model dataset, or the registered second image data and the registered model dataset as the result image data.

11. A system comprising:
a provision unit for providing result image data, the provision unit comprising:
a processor configured to:
receive first image data of a subject including an examination region, the first image data being pre-acquired, wherein the first image data maps the examination region;
generate a model dataset based on the first image data;
receive second image data of the subject that is pre-acquired, wherein the model dataset and the second image data map at least a common part of the examination region at a second level of detail;
pre-align the model dataset and the second image data at a first level of detail below the second level of detail based on:
first features of a first class of features of the examination region that are mapped at the first level of detail in the model dataset and the second image data;
an acquisition geometry of the second image data with respect to the subject; or
a combination thereof;
register the model dataset and the second image data at the second level of detail based on second features of a second class of features of the examination region that are mapped at the second level of detail in the model dataset and the second image data, wherein the second class of features is mappable at the second level of detail or above; and
provide the registered second image data, the registered model dataset, or the registered second image data and the registered model dataset as the result image data;
at least one medical imaging device; and
a display unit,
wherein the at least one medical imaging device is configured to:
acquire the first image data of the subject including the examination region; and
acquire the second image data of the subject, and
wherein the display unit is configured to display a graphical representation of the result image data.

12. The system of claim 11, wherein the at least one medical imaging device comprises a first medical imaging device and a second medical imaging device,
wherein the first medical imaging device and the second medical imaging device are different imaging modalities,
wherein the first medical imaging device is configured to acquire the first image data, and
wherein the second medical imaging device is configured to acquire the second image data.

13. The system of claim 12, wherein the first medical imaging device is an extracorporeal imaging modality, and
wherein the second medical imaging device is an endoluminal imaging modality.

14. In a non-transitory computer-readable storage medium that stores instructions executable by one or more processors to provide result image data, the instructions comprising:
receiving first image data of a subject including an examination region, the first image data being pre-acquired, wherein the first image data maps the examination region;
generating a model dataset based on the first image data;
receiving second image data of the subject that is pre-acquired, wherein the model dataset and the second image data map at least a common part of the examination region at a second level of detail;
pre-aligning the model dataset and the second image data at a first level of detail below the second level of detail based on:
first features of a first class of features of the examination region that are mapped at the first level of detail in the model dataset and the second image data;
an acquisition geometry of the second image data with respect to the subject; or
a combination thereof;
registering the model dataset and the second image data at the second level of detail based on second features of a second class of features of the examination region that are mapped at the second level of detail in the model dataset and the second image data, wherein the second class of features is mappable at the second level of detail or above; and
providing the registered second image data, the registered model dataset, or the registered second image data and the registered model dataset as the result image data.

15. The non-transitory computer-readable storage medium of claim 14, wherein the instructions further comprise receiving a geometric, anatomical, or geometric and anatomical model, initial image data, or a combination thereof of the examination region,
wherein the generating of the model dataset comprises registering the first image data to the geometric, anatomical, or geometric and anatomical model, the initial image data, or the combination thereof based on further features of the first class of features that are mapped in the first image data and represented in the geometric, anatomical, or geometric and anatomical model, the initial image data, or the combination thereof at the first level of detail.

16. The non-transitory computer-readable storage medium of claim 14, wherein the second class of features is unique above the first level of detail, and
wherein the pre-alignment of the model dataset and the second image data provides a pre-alignment of the second features of the second class of features at the first level of detail for registering the model dataset and the second image data at the second level of detail.

17. The non-transitory computer-readable storage medium of claim 14, wherein the first image data comprises a number of first mappings of the examination region, and
wherein the generating of the model dataset comprises reconstructing the model dataset from the first mappings.

18. The non-transitory computer-readable storage medium of claim 17, wherein the first mappings map a number of at least partially different sections of the examination region of the subject, and
wherein the registering of the model dataset and the second image data comprises identifying at least one of the first mappings in the model dataset based on the pre-alignment of the model dataset and the second image data, the at least one first mapping corresponding with the mapping of the common part of the examination region in the second image data.

* * * * *